(12) United States Patent
Grace et al.

(10) Patent No.: US 12,040,501 B2
(45) Date of Patent: Jul. 16, 2024

(54) IMPACT PROTECTION SHROUDS FOR PROTECTING BATTERY PACK COMPONENTS

(71) Applicant: FORD GLOBAL TECHNOLOGIES, LLC, Dearborn, MI (US)

(72) Inventors: Ihab Grace, Grosse Pointe Woods, MI (US); Micah Smith, Detroit, MI (US); Brad Warren Probert, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 692 days.

(21) Appl. No.: 16/788,354

(22) Filed: Feb. 12, 2020

(65) Prior Publication Data

US 2021/0249638 A1  Aug. 12, 2021

(51) Int. Cl.
| | | |
|---|---|---|
| *H01M 50/242* | (2021.01) | |
| *H01M 10/625* | (2014.01) | |
| *H01M 50/204* | (2021.01) | |
| *H01M 50/224* | (2021.01) | |
| *H01M 50/276* | (2021.01) | |
| *H01M 50/298* | (2021.01) | |
| *H01M 50/502* | (2021.01) | |
| *H01M 10/6554* | (2014.01) | |
| *H01M 50/10* | (2021.01) | |

(52) U.S. Cl.
CPC ....... *H01M 50/242* (2021.01); *H01M 10/625* (2015.04); *H01M 50/204* (2021.01); *H01M 50/224* (2021.01); *H01M 50/276* (2021.01); *H01M 50/298* (2021.01); *H01M 50/502* (2021.01); *H01M 10/6554* (2015.04); *H01M 50/10* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 8,584,779 B2 | 11/2013 | Tsuchiya et al. | |
| 2010/0173191 A1 | 7/2010 | Meintschel et al. | |
| 2014/0220391 A1* | 8/2014 | Fujii | H01M 10/6554 429/7 |
| 2018/0138565 A1* | 5/2018 | Lee | H01M 50/209 |
| 2018/0248159 A1* | 8/2018 | Kim | H01M 10/425 |
| 2018/0294450 A1 | 10/2018 | Haag et al. | |
| 2019/0334141 A1* | 10/2019 | Kwon | H01M 10/647 |
| 2020/0388805 A1* | 12/2020 | Yoo | H01M 10/613 |
| 2021/0104779 A1* | 4/2021 | Gao | H01M 50/204 |
| 2021/0140779 A1* | 5/2021 | Uenoyama | G01C 21/3697 |

* cited by examiner

*Primary Examiner* — Alix E Eggerding
(74) *Attorney, Agent, or Firm* — David B. Kelley; Carlson, Gaskey & Olds, P.C.

(57) ABSTRACT

This disclosure details exemplary battery pack designs for use in electrified vehicles. An exemplary battery pack may include an enclosure assembly that houses one or more battery arrays. An impact protection shroud is mounted to a portion of at least one of the battery arrays. A battery sensitive component is at least partially covered by the impact protection shroud. The impact protection shroud is configured to establish minimum clearances relative the battery sensitive component and to redirect loads away from the battery sensitive component, thereby protecting the battery sensitive component during vehicle impact loading events.

1 Claim, 7 Drawing Sheets

IMPACT PROTECTION SHROUDS FOR PROTECTING BATTERY PACK COMPONENTS

TECHNICAL FIELD

This disclosure relates to electrified vehicle traction battery packs, and more particularly to impact protection shrouds for protecting battery pack internal components.

BACKGROUND

Electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. An enclosure assembly of the battery pack houses a plurality of battery internal components including, but not limited to, battery arrays and battery electronics. Depending on the packaging location of the battery internal components, some components may be more susceptible to impact loads than other components.

SUMMARY

A battery pack according to an exemplary aspect of the present disclosure includes, among other things, an enclosure assembly, a first battery array housed within the enclosure assembly, an impact protection shroud mounted to a portion of the first battery array, and a battery sensitive component mounted to the first battery array and at least partially covered by the impact protection shroud.

In a further non-limiting embodiment of the foregoing battery pack, the impact protection shroud is a stamped, aluminum component.

In a further non-limiting embodiment of either of the foregoing battery packs, the impact protection shroud is a cast, steel component.

In a further non-limiting embodiment of any of the foregoing battery packs, a second battery array is housed within the enclosure assembly. The first battery array is a second tier battery array positioned over top of the second battery array.

In a further non-limiting embodiment of any of the foregoing battery packs, the portion of the first battery array is an array end plate.

In a further non-limiting embodiment of any of the foregoing battery packs, the impact protection shroud is mounted to an upper surface of the array end plate by a first fastener and is mounted to a vertical surface of the array end plate by a second fastener.

In a further non-limiting embodiment of any of the foregoing battery packs, the first and second fasteners are bolts, screws, or weld beads.

In a further non-limiting embodiment of any of the foregoing battery packs, the battery sensitive component is an interconnected bus bar (ICB) module.

In a further non-limiting embodiment of any of the foregoing battery packs, the battery sensitive component is a high voltage connector.

In a further non-limiting embodiment of any of the foregoing battery packs, the impact protection shroud includes a cap portion having an upper section that covers a column bolt and a lower section that partially covers the battery sensitive component.

In a further non-limiting embodiment of any of the foregoing battery packs, the column bolt extends through the portion of the first battery array, and the battery sensitive component is a cover of a bus bar module.

In a further non-limiting embodiment of any of the foregoing battery packs, the impact protection shroud includes a first mounting flange mounted to a first surface of the portion of the first battery array, a second mounting flange mounted to a second surface of the portion of the first battery array, and a cap portion that at least partially covers the battery sensitive component.

In a further non-limiting embodiment of any of the foregoing battery packs, the impact protection shroud includes a first mounting leg mounted to a first surface of the portion of the first battery array, a second mounting leg mounted to a second surface of the portion of the first battery array, and a cap portion that at least partially covers the battery sensitive component.

In a further non-limiting embodiment of any of the foregoing battery packs, a portion of the battery sensitive component is uncovered by the impact protection shroud.

In a further non-limiting embodiment of any of the foregoing battery packs, the impact protection shroud is mounted near a corner of the portion of the first battery array.

A battery pack according to another exemplary aspect of the present disclosure includes, among other things, an enclosure assembly including a tray and a cover, a first tier of battery arrays positioned within the tray, a second tier of battery arrays positioned above the first tier, a battery sensitive component mounted to a battery array of the second tier of battery arrays, and an impact protection shroud mounted to an array end plate of the battery array and arranged to cover at least a portion of the battery sensitive component.

In a further non-limiting embodiment of the foregoing battery pack, the battery sensitive component is an interconnected bus bar (ICB) module, a high voltage connector, or both.

In a further non-limiting embodiment of either of the foregoing battery packs, the impact protection shroud is mounted to an upper surface of the array end plate by a first fastener and is mounted to a vertical surface of the array end plate by a second fastener.

In a further non-limiting embodiment of any of the foregoing battery packs, a first portion of the impact protection shroud covers a column bolt of the battery array, and a second portion of the impact protection shroud partially covers the battery sensitive component.

In a further non-limiting embodiment of any of the foregoing battery packs, another portion of the battery sensitive component is uncovered by the impact protection shroud.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack may include an enclosure assembly that houses one or more battery arrays. An impact protection shroud is mounted to a portion of at least one of the battery arrays. A battery sensitive component is at least partially covered by the impact protection shroud. The impact protection shroud is configured to establish minimum clearances relative the battery sensitive component and to redirect loads away from the battery sensitive component, thereby protecting the battery sensitive component during vehicle impact loading events. These and other features are discussed in greater detail in the following paragraphs of this detailed description.

Figure 1:
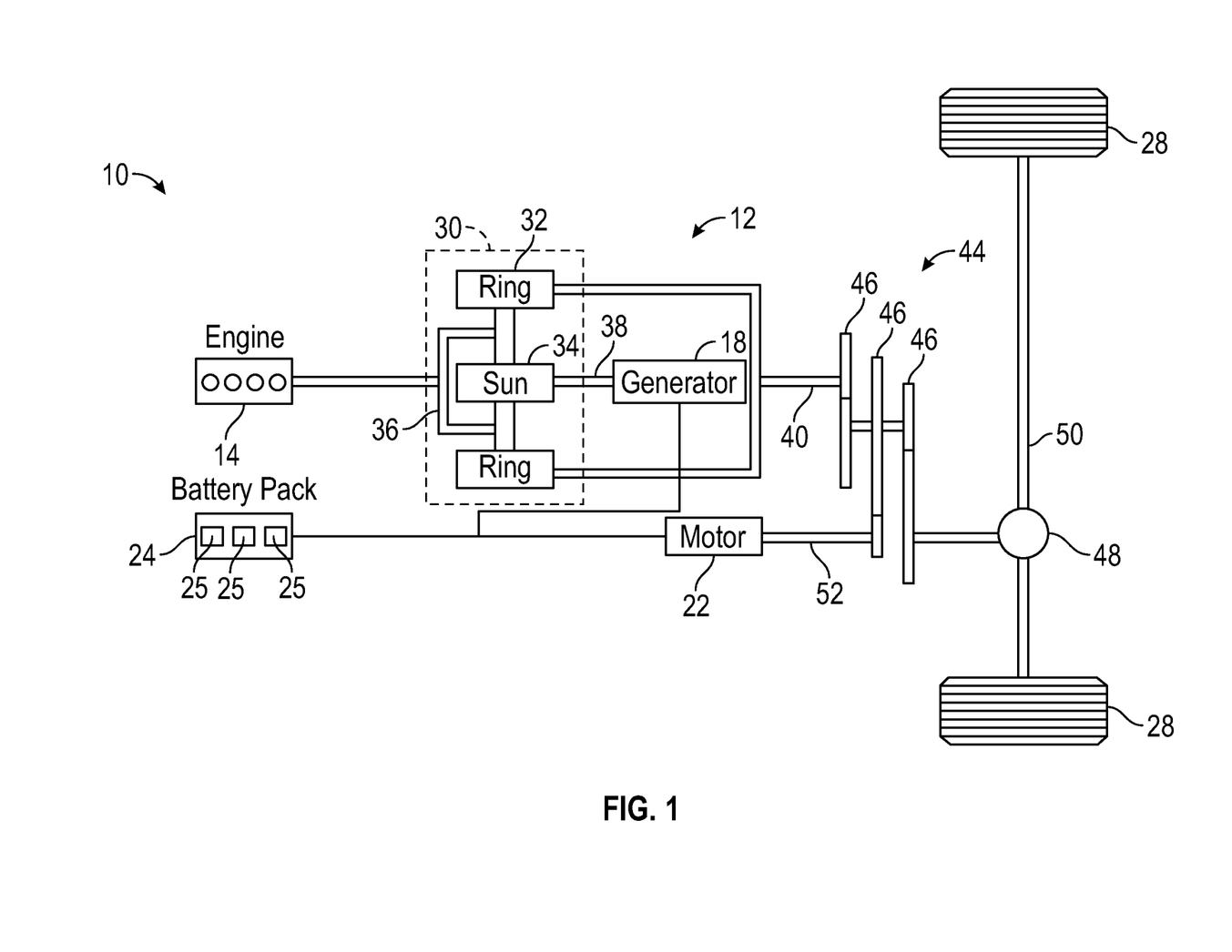
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
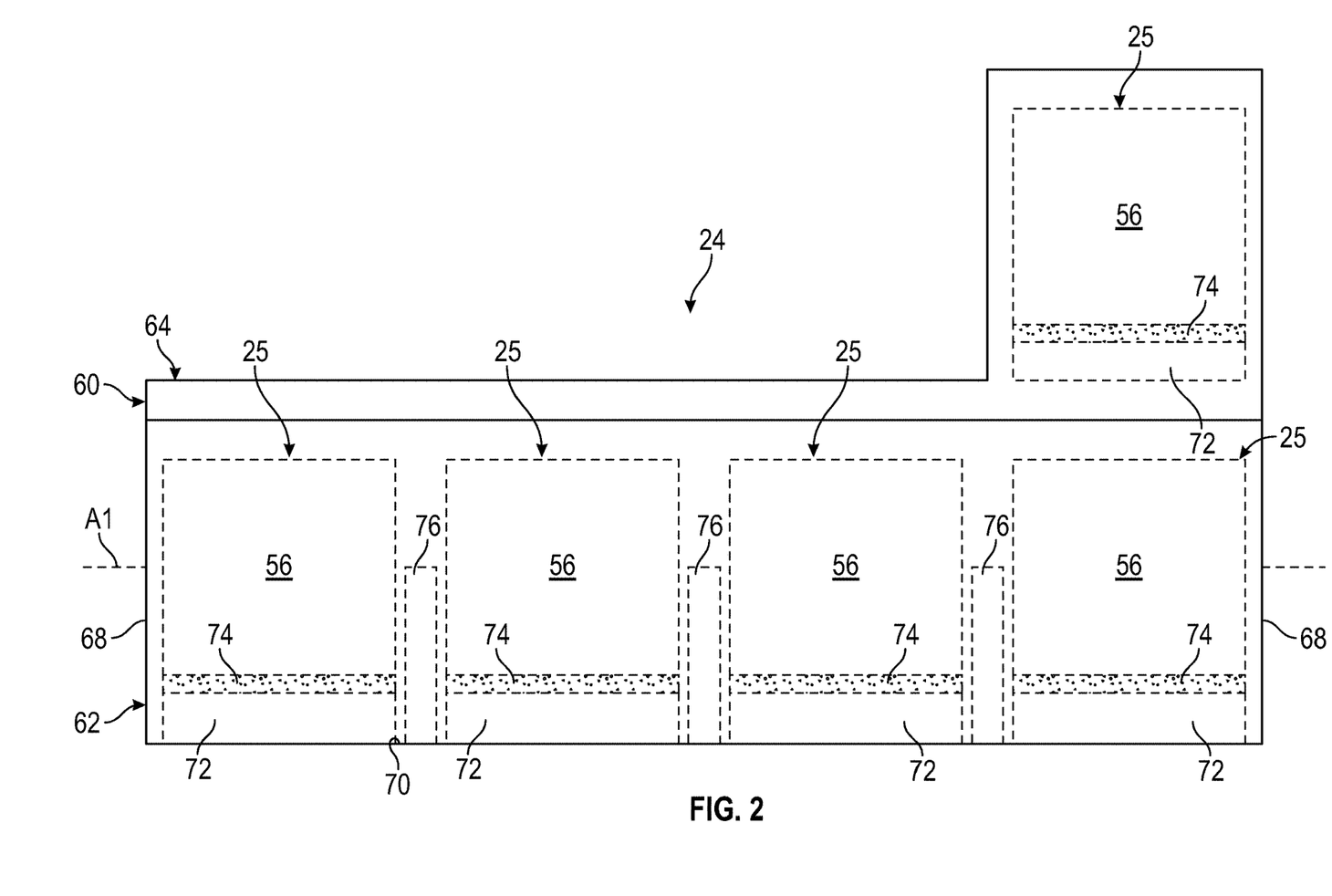
FIG. 2 schematically illustrates a battery pack of an electrified vehicle.
Figure 3:
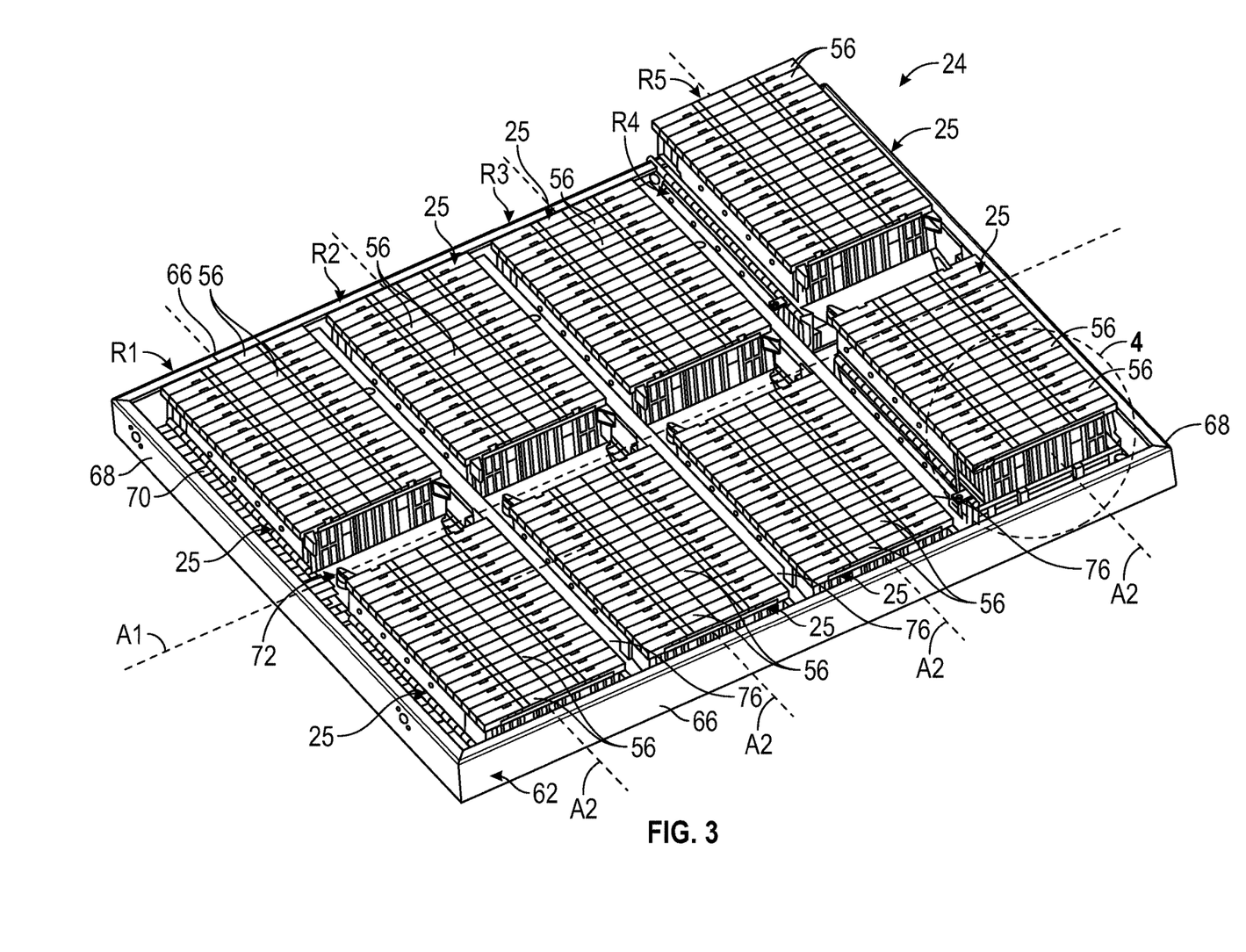
FIG. 3 is a perspective view of the battery pack of FIG. 2 with select portions removed in order to better illustrate an interior of the battery pack.

FIGS. 2 and 3 illustrate a battery pack 24 that can be employed within an electrified vehicle, such as the electrified vehicle 12 of FIG. 1. A highly schematic front view of the battery pack 24 is shown in FIG. 2, and a perspective view of the battery pack 24 is shown in FIG. 3. Portions (e.g., a cover 64) of the battery pack 24 are removed in FIG. 3 in order to better visualize its internal contents.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure is not limited to the exact configuration shown in FIGS. 2-3.

The battery cells 56 may be stacked side-by-side along one or more stack axes to construct groupings of battery cells 56, sometimes referred to as "cell stacks" or "cell arrays." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56 of each grouping, along with any support structures (e.g., array frames, spacers, rails, walls, end plates, side plates, bindings, etc.), may collectively be referred to as a battery assembly or a battery array 25. The battery pack 24 depicted in FIG. 3 includes four rows (labeled as rows R1, R2, R3, and R4) of two laterally adjacent battery arrays 25 for a total of eight battery arrays 25. An additional row R5 (i.e., a second tier) of two adjacent battery arrays 25 may be stacked on top of at least one of the rows R1-R4 (as illustrated, row R5 is stacked on top of row R4) for a total of ten battery arrays 25. However, the battery pack 24 could include a greater or fewer number of battery arrays and still fall within the scope of this disclosure.

An enclosure assembly 60 may house each battery array 25 of the battery pack 24. The enclosure assembly 60 may extend along a central longitudinal axis A1 and may include a tray 62 and a cover 64. The enclosure assembly 60 may include any size, shape, and configuration within the scope of this disclosure.

The tray 62 may include a pair of longitudinally extending side walls 66, a pair of laterally extending side walls 68, and a floor 70 disposed between the pair of longitudinally extending side walls 66 and the pair of laterally extending side walls 68. The longitudinally extending side walls 66 may extend in parallel with the central longitudinal axis A1, and the laterally extending side walls 68 may extend generally perpendicular to the central longitudinal axis A1. When mounted to the electrified vehicle 12, the longitudinally extending side walls 66 of the tray 62 extend in parallel with a front-to-rear length of the electrified vehicle 12, and the laterally extending side walls 68 extend in parallel with cross-width of the electrified vehicle 12.

In an embodiment, the enclosure assembly 60 is a sealed enclosure. For example, during assembly, the battery arrays 25 may be arranged relative to one another within the tray 62, and the cover 64 may then be fixedly secured to the tray 62 to seal the battery arrays 25 therein.

Each row R1-R4 of battery arrays 25 may include a heat exchanger plate 72, which is sometimes referred to as a cold plate or cold plate assembly. Therefore, in an exemplary embodiment, the two battery arrays 25 of each row R1-R5 share a common heat exchanger plate 72. The battery arrays 25 of each row R1-R5 may be positioned relative to the heat exchanger plate 72 such that the battery cells 56 are either in direct contact with or in close proximity to their respective heat exchanger plate 72. In an embodiment, the heat exchanger plates 72 are positioned against the floor 70 of the tray 62, and the battery arrays 25 are positioned on top of the heat exchanger plates 72.

In another embodiment, a thermal interface material (TIM) 74 (schematically shown in FIG. 2) may optionally be positioned between the battery arrays 25 and the heat exchanger plates 72 such that exposed surfaces of the battery cells 56 are in direct contact with the TIM 74. The TIM 74 maintains thermal contact between the battery cells 56 and the heat exchanger plates 72, thereby increasing the thermal conductivity between these neighboring components during heat transfer events. The TIM 74 may be made of any known thermally conductive material. In an embodiment, the TIM 74 includes an epoxy resin. In another embodiment, the TIM 74 includes a silicone based material. Other materials, including but not limited to thermal greases, may alternatively or additionally make up the TIM 74.

The heat exchanger plates 72 may be part of a liquid cooling system that is configured for thermally managing the battery cells 56 of each battery array 25. For example, heat may be generated and released by the battery cells 56 during charging operations, discharging operations, extreme ambient conditions, or other conditions. It may be desirable to remove the heat from the battery arrays 25 to improve capacity, life, and performance of the battery cells 56. The heat exchanger plates 72 are configured to conduct the heat out of the battery cells 56. In other words, the heat exchanger plates 72 may operate as heat sinks for removing heat from the heat sources (i.e., the battery cells 56). The heat exchanger plates 72 could alternatively be employed to heat the battery cells 56, such as during extremely cold ambient conditions.

A battery internal structure 76, such as a relatively rigid cross member, may be positioned between each adjacent row of battery arrays 25. In general, the battery internal structures 76 add rigidity to the battery pack 24 and may establish mounting points for securing the battery arrays 25 relative to the tray 62.

In an embodiment, one battery internal structure 76 is disposed between the rows R1 and R2 of battery arrays 25, another battery internal structure 76 is disposed between the rows R2 and R3, and yet another battery internal structure 76 is disposed between the rows R3 and R4 for a total of three battery internal structures 76 provided within the enclosure assembly 60. However, the total number of battery internal structures 76 provided inside the enclosure assembly 60 is not intended to limit this disclosure.

The battery internal structures 76 may connect between the longitudinally extending side walls 66 of the tray 62 and therefore are arranged, in the illustrated embodiment, in a cross-vehicle orientation. In an embodiment, both the battery arrays 25 and the battery internal structures 76 extend along axes A2 that are generally perpendicular to the central longitudinal axis A1 of the enclosure assembly 60.

In addition to the battery arrays 25, the battery pack 24 may include a plurality of other battery sensitive components (e.g., high voltage connectors, bus bar modules, etc.) that are housed within the enclosure assembly 60. Depending on their mounting locations inside the enclosure assembly 60, the battery sensitive components may be susceptible to various vehicle loads including, but not limited to, impact loads (e.g., loads imparted during vehicle impact loading events, for example). If not isolated or redirected, these impact loads could be transferred directly into the battery sensitive components, which could, in turn, damage the battery sensitive components.

Novel impact protection shrouds for protecting the battery sensitive components are therefore proposed in this disclosure. As discussed in greater detail below, the exemplary impact protection shrouds of this disclosure are capable of absorbing, redirecting, and/or distributing impact loads that may be imparted during vehicle impact loading events (e.g., front, side, side pole, rear, etc.), thereby substantially minimizing the transfer of the impact loads into the battery sensitive components.

Figure 4:
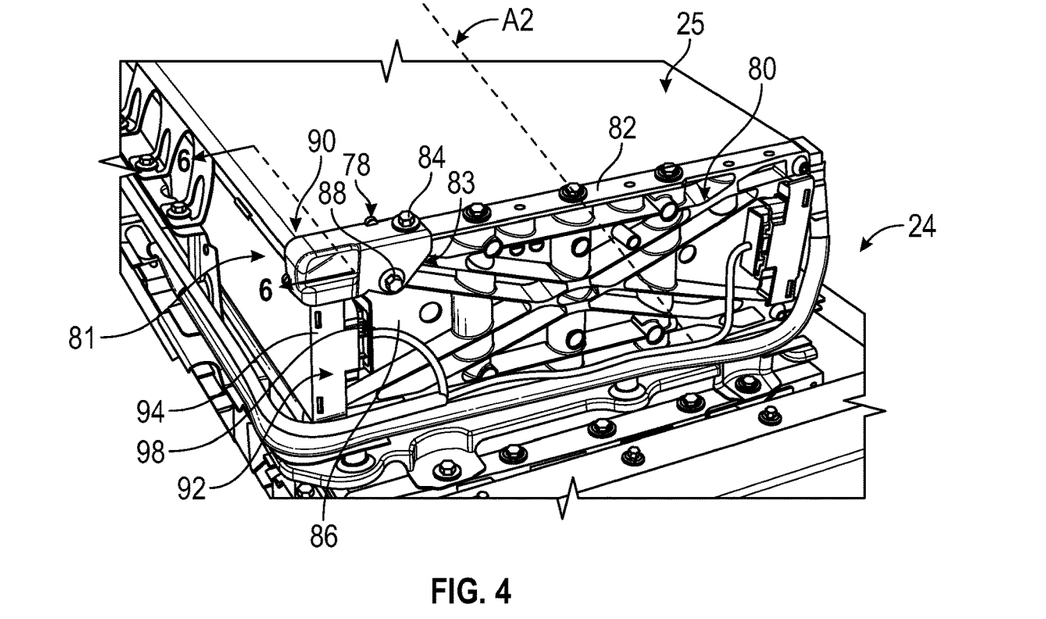
FIG. 4 is a blown up view of select portions of FIG. 3.
Figure 5:
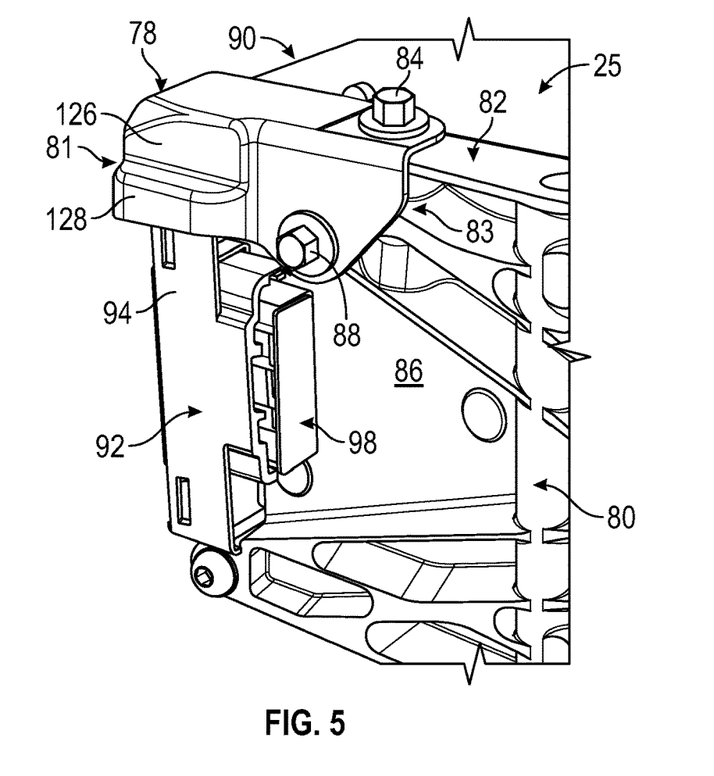
FIG. 5 is a blown up view of select portions of a battery array of the battery pack of FIG. 3.
Figure 6:
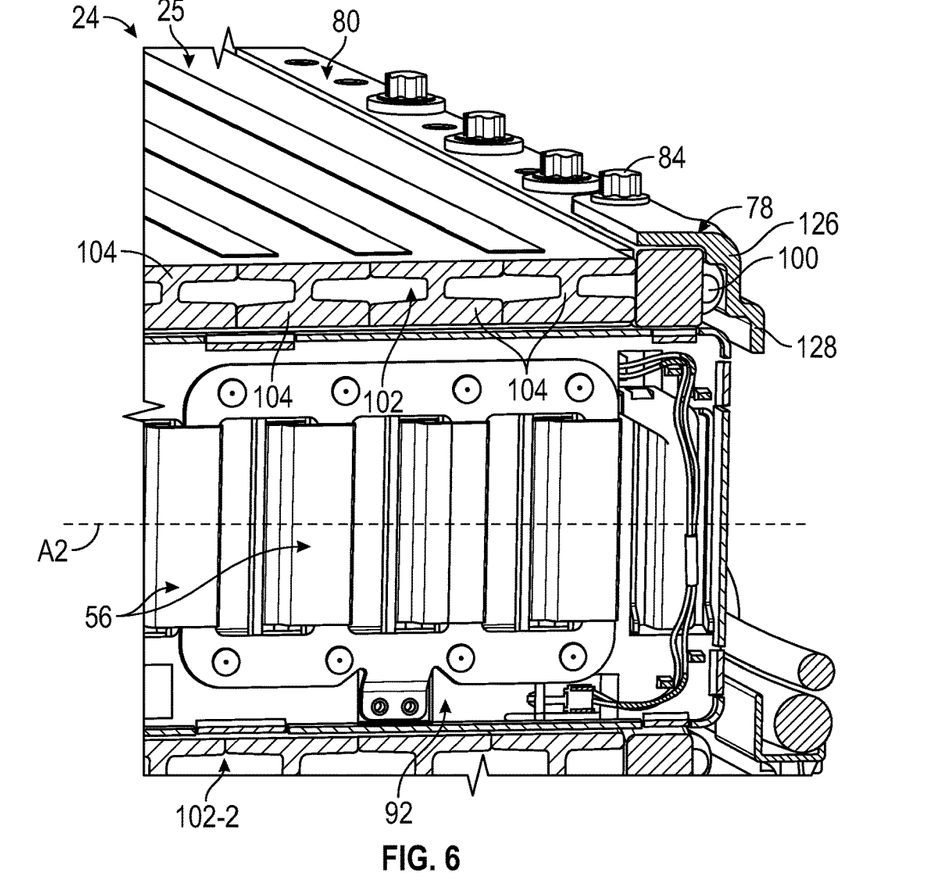
FIG. 6 is a cross-sectional view through section 6-6 of FIG. 4.

Referring now to FIGS. 4, 5, and 6, one or more impact protection shrouds 78 may be mounted to select portions of a battery array 25 of a battery pack 24. In an embodiment, the battery array 25 is a second tier battery array. However, the impact protection shroud 78 could alternatively or additionally be provided on a first tier battery array of the battery pack 24.

In an embodiment, the impact protection shroud 78 is mounted to an array end plate 80 of the battery array 25. The array end plate 80 is a structural component of the battery array 25 and may be positioned at a longitudinal extent of the battery array 25 such that it extends along an axis that is transverse to the longitudinal axis A2 of the battery array 25. Although shown herein as being mounted directly to the array end plate 80, other mounting locations for the impact protection shroud 78 are also contemplated within the scope of this disclosure.

The impact protection shroud 78 may be mounted to at least two different surfaces of the array end plate 80. For example, the impact protection shroud 78 may be mounted to an upper surface 82 of the array end plate 80 by a first fastener 84, and the impact protection shroud 78 may be mounted to a vertical (i.e., Z-axis) surface 86 of the array end plate 80 by a second fastener 88. The fasteners 84, 88 may be bolts, screws, weld beads, or any other type of mechanical fastener. The upper surface 82 is substantially perpendicular to the vertical surface 86, in an embodiment.

The impact protection shroud 78 is mounted near a corner 90 of the array end plate 80. A first end portion 81 of the impact protection shroud 78 may extend slightly outboard of an outermost edge of the corner 90, and a second, opposite end portion 83 of the impact protection shroud 78 may extend toward an opposite corner 90 of the array end plate 80.

Figure 7:
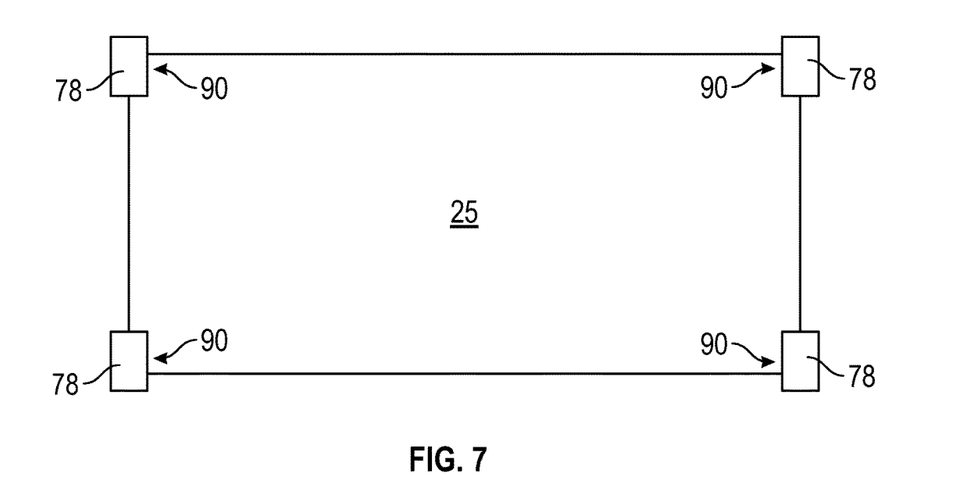
FIG. 7 illustrates an exemplary battery array equipped with a plurality of impact protection shrouds.

Although only a single impact protection shroud 78 is illustrated in FIGS. 4-6, additional protection shrouds 78 could be provided at one or more of the additional corners 90. In another embodiment, an impact protection shroud 78 is mounted near each corner 90 of the battery array 25 for a total of four impact protections shrouds (see, e.g., FIG. 7). The total number and mounting locations of the impact protection shrouds 78 that are provided on the battery array 25 may vary depending on the design of the battery pack and its mounting location within an electrified vehicle, among various other design criteria.

The impact protection shroud 78 at least partially covers or shrouds a battery sensitive component 92 that is also connected to the battery array 25. The impact protection shroud 78 may be arranged such that at least a portion of the battery sensitive component 92 is uncovered by the impact protection shroud 78.

The battery sensitive component 92 may be a portion (e.g., a cover 94) of an interconnected bus bar (ICB) module 96 that electrically connects the battery cells of the battery array 25, a high voltage connector 98, or both. The impact protection shroud 78 could be configured to protect any battery sensitive component that is secured to the battery array 25 and housed within the battery pack 24, and therefore the ICB module 96 and the high voltage connector 98 are described herein only as non-limiting examples of battery sensitive components.

The impact protection shroud 78 may additionally cover a portion (e.g., a head) 100 of a column bolt 102 of the battery array 25. As best shown in FIG. 6, for example, the column bolt 102 may extend through the array end plate 80 and through a plurality of array frames 104 for assembling the battery array 25 as a homogenous unit. The column bolt 102 may generally extend in parallel with the longitudinal axis A2 of the battery array 25. The array frames 104 may interconnect with one another and may each be configured to receive and retain one or more of the battery cells 56 of the battery array 25. The battery array 25 could include one or more additional column bolts (see, e.g., column bolt 102-2) that are uncovered by the impact protection shroud 78.

Figure 8:
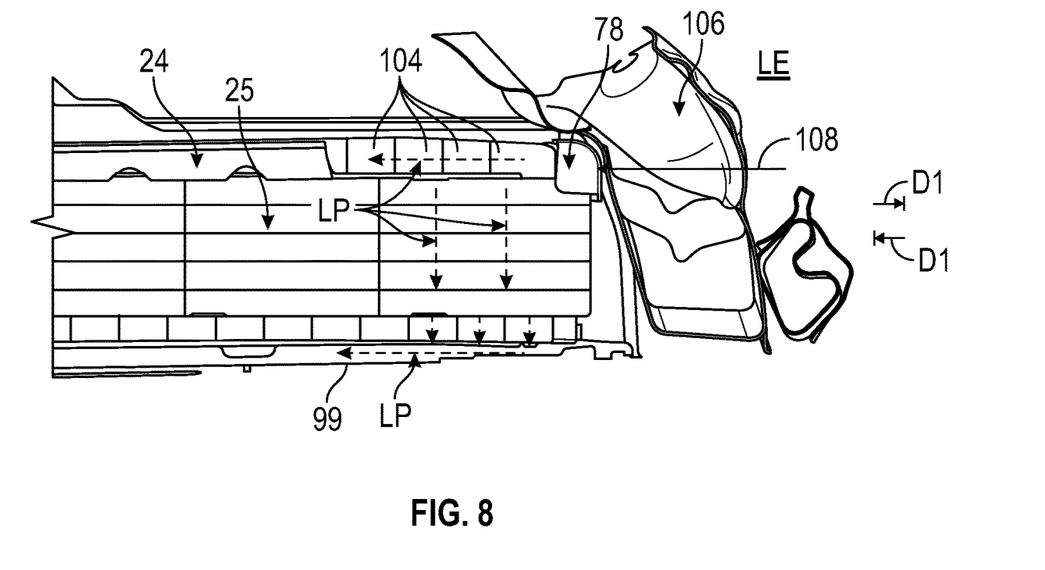
FIG. 8 schematically illustrates a load path through an impact protection shroud of a battery array during a vehicle impact loading event.

FIG. 8, with continued reference to FIGS. 4-6, schematically illustrates the behavior of the impact protection shroud 78 during a vehicle impact loading event LE. The vehicle impact loading event LE may be a side pole impact event in which the electrified vehicle 12 moves in a direction D1 into an object, such as a stationary pole, or the vehicle impact loading event LE may be a side impact loading event in which an object, such as another vehicle, moves in a direction D2 into a side of the electrified vehicle 12. In either case, during the vehicle impact loading event LE, impact loads 108 may force portions of a vehicle frame 106 to which the battery pack 24 is mounted into the battery pack 24. When this occurs, the impact protection shroud 78 can redirect portions of the impact loads 108 along a load path LP, thereby transferring the impact loads 108 away from the battery sensitive component 92. For example, the impact protection shroud 78 may redirect the impact loads 108 into one or more structural components, such as the array frames 104 and/or heat exchanger plates/mid-trays 99) of the battery pack 24. The impact protection shroud 78 therefore substantially protects the battery sensitive component 92 from being damaged by the impact loads 108.

Figure 9:
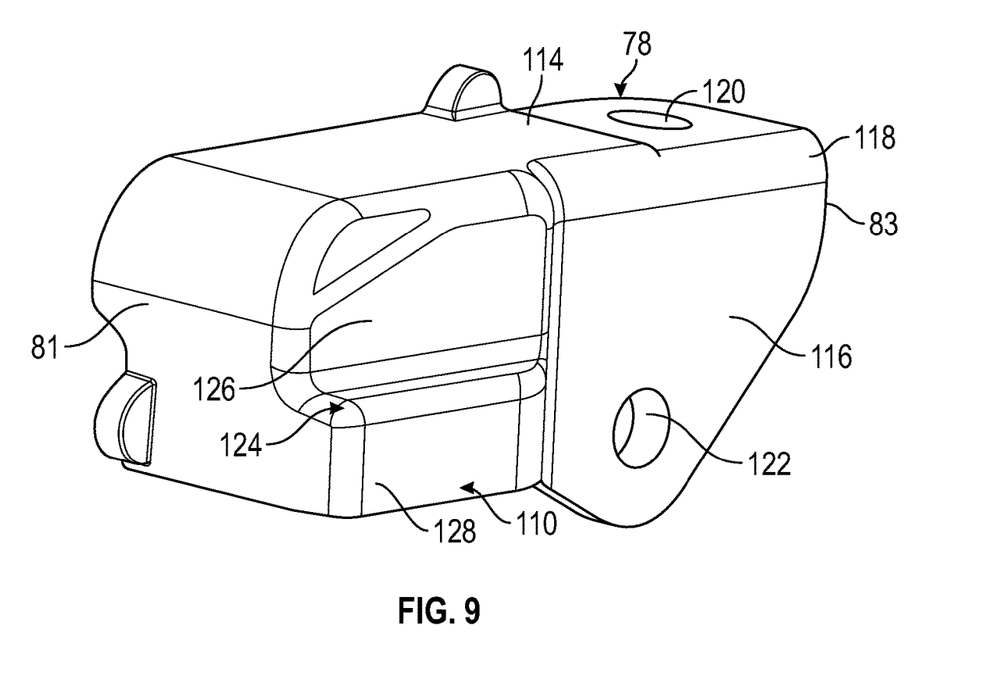
FIG. 9 illustrates an external surface of an exemplary impact protection shroud for use within a battery pack.
Figure 10:
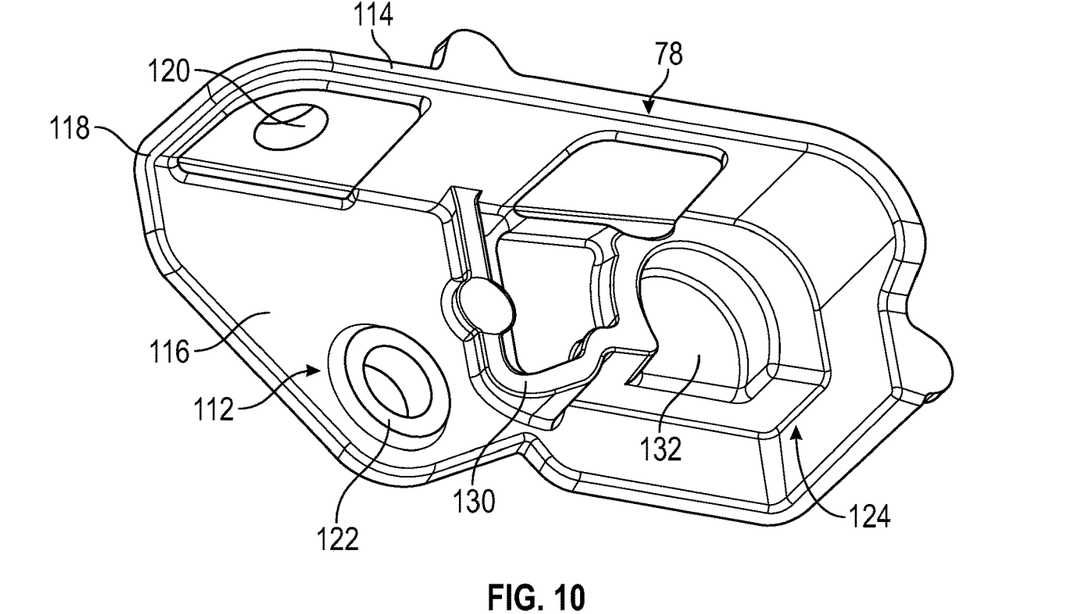
FIG. 10 illustrates an internal surface of the impact protection shroud of FIG. 9.

FIGS. 9 and 10 illustrate further details of the exemplary impact protection shroud 78 discussed above. An outer surface 110 of the impact protection shroud 78 is shown in FIG. 9, and an inner surface 112 of the impact protection shroud 78 is shown in FIG. 10. The inner surface 112 is configured to interface with the array end plate 80, and the outer surface 110 faces in a direction away from the array end plate 80.

In an embodiment, the impact protection shroud 78 is a stamped component made out of a metallic material, such as aluminum or steel. However, other manufacturing techniques and materials could alternatively be utilized to manufacture the impact protection shroud 78.

The impact protection shroud 78 may include a first mounting flange 114, a second mounting flange 116, and a bent portion 118 that connects the first mounting flange 114 to the second mounting flange 116. The first and second mounting flanges 114, 116 may extend transversely relative to one another, and in an exemplary embodiment, are substantially perpendicular to one another.

The first mounting flange 114 may include a first opening 120 and the second mounting flange 116 may include a second opening 122. The first opening 120 is sized to receive the first fastener 84 for mounting the first mounting flange 114 to the upper surface 82 of the array end plate 80, and the second opening 122 is sized to receive the second fastener 88 for mounting the second mounting flange 116 to the vertical surface 86 of the array end plate 80 (as shown, for example, in FIGS. 4-5).

A cap portion 124 may be integrally joined with the second mounting flange 116. The cap portion 124 may extend between the second mounting flange 116 and the first end portion 81 of the impact protection shroud 78. An upper edge of the first end portion 81 may be integrally joined with the first mounting flange 114.

The cap portion 124 may include an upper section 126 and a lower section 128. The lower section 128 may flare outwardly relative to the lower section 128 to establish a stepped design. In an embodiment, the upper section 126 covers the column bolt 102 of the battery 25 and the lower section 128 partially covers the battery sensitive component 92 of the battery array 25 (as shown, for example, in FIGS. 5-6).

As best illustrated in FIG. 10, the inner surface 112 of the impact protection shroud 78 may include a rib 130 for increasing the strength of the impact protection shroud 78 and for establishing a load path through the impact protection shroud 78 during vehicle impact loading events. The inner surface 112 may additionally include a recessed portion 132 for accommodating the portion 100 of the column bolt 102.

Figure 11:
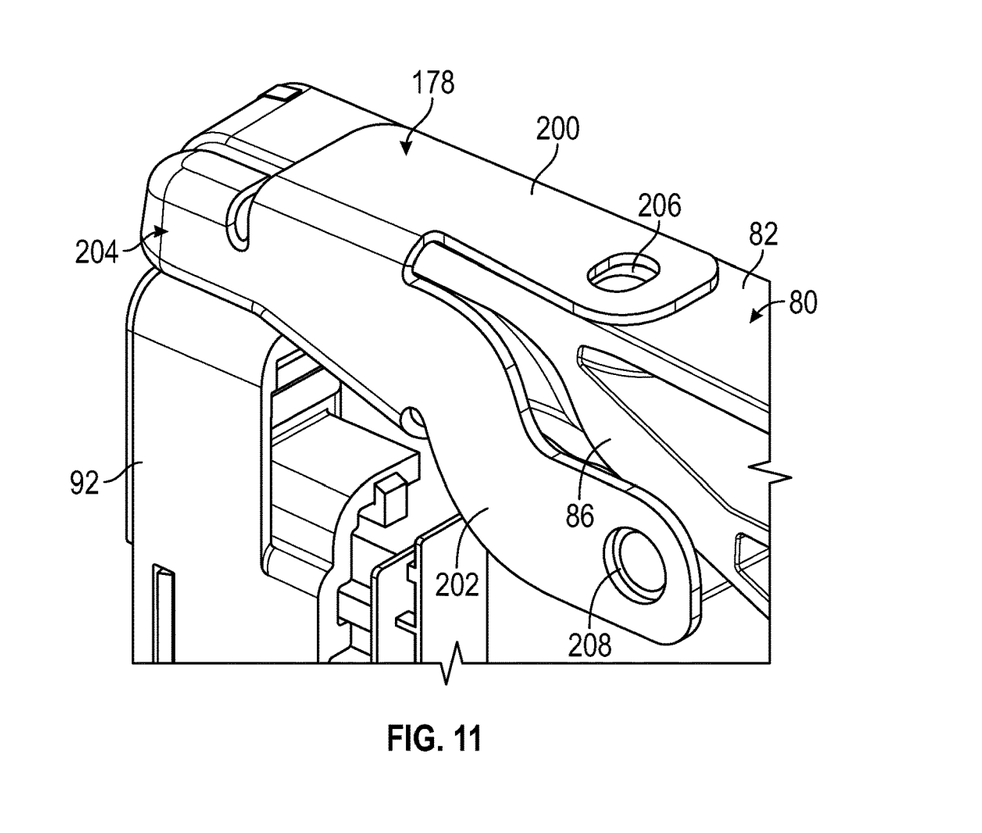
FIG. 11 illustrates another exemplary impact protection shroud for use within a battery pack.

FIG. 11 illustrates another exemplary impact protection shroud 178 that can be used to protect sensitive components inside a battery pack. In an embodiment, the impact protection shroud 178 is a cast component made out of a metallic material, such as steel. However, other manufacturing techniques and materials could alternatively be utilized to manufacture the impact protection shroud 178.

The impact protection shroud 178 may include a first mounting leg 200, a second mounting leg 202, and a cap portion 204. The first mounting leg 200 may include a first opening 206 and the second mounting leg 202 may include a second opening 208. The first opening 206 may be sized to receive a fastener for mounting the first mounting leg 200 to an upper surface 82 of an array end plate 80, and the second opening 208 may be sized to receive another fastener for mounting the second mounting leg 202 to a vertical surface 86 of the array end plate 80. The cap portion 204 may cover at least a portion of a battery sensitive component 92.

Although exemplary impact protection shroud designs are described above and illustrated in FIGS. 4-11, the size, shape, and overall configuration of the impact protection shroud is not intended to limit this disclosure and could vary depending on the battery sensitive component it is designed to protect, the design of the battery array, etc.

The exemplary battery packs of this disclosure incorporate impact protection shrouds for protecting battery sensitive components. The impact protection shrouds provide relatively small, lightweight, and cost effective solutions for protecting battery sensitive components during potential vehicle impact loading events. The impact protection shrouds can be implemented with minimal design changes on either the battery-side or vehicle-side.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly including a tray and a cover;
a first tier of battery arrays positioned within the tray;
a second tier of battery arrays positioned above the first tier;
an interconnected bus bar (ICB) mounted to a battery array of the second tier of battery arrays; and
an impact protection shroud mounted to an array end plate of the battery array and arranged to cover only a first portion of the ICB such that a second portion of the ICB is left uncovered,
wherein the impact protection shroud is mounted to a first surface of the array end plate by a first fastener and is mounted to a second surface of the array end plate by a second fastener,
wherein the first fastener extends along a first longitudinal axis and the second fastener extends along a second longitudinal axis that is transverse to the first longitudinal axis.

* * * * *